United States Patent [19]
Cencel

[11] 3,860,918
[45] Jan. 14, 1975

[54] CAPACITIVE POSITION TRANSDUCER

[75] Inventor: J. Arthur Cencel, Sherman Oaks, Calif.

[73] Assignee: Becton, Dickinson Electronics Company, Rutherford, N.J.

[22] Filed: June 25, 1973

[21] Appl. No.: 373,494

[52] U.S. Cl. .............................. 340/200, 317/246
[51] Int. Cl. .......................................... G08c 19/10
[58] Field of Search ...................... 340/200; 323/93

[56] References Cited
UNITED STATES PATENTS

| | | |
|---|---|---|
| 2,446,428 | 8/1948 | Merrill .............................. 340/200 |
| 2,544,012 | 3/1951 | Edelman ............................ 340/200 |
| 2,968,952 | 1/1961 | Stalder .................................. 323/93 |
| 3,219,920 | 11/1965 | Wall .................................... 340/200 |
| 3,729,728 | 4/1973 | Hardway ............................ 340/200 |
| 3,784,897 | 1/1974 | Norrie ................................ 340/200 |

*Primary Examiner*—Thomas B. Habecker
*Attorney, Agent, or Firm*—Marvin H. Kleinberg

[57] ABSTRACT

A capacitance position transducer measures relative position between two members, generating a signal indicative of the positional change. The transducer includes a first plate and a pair of opposing plates, one of which may be a "standard," the other of which provides a variable area as a function of a dimension.

15 Claims, 7 Drawing Figures

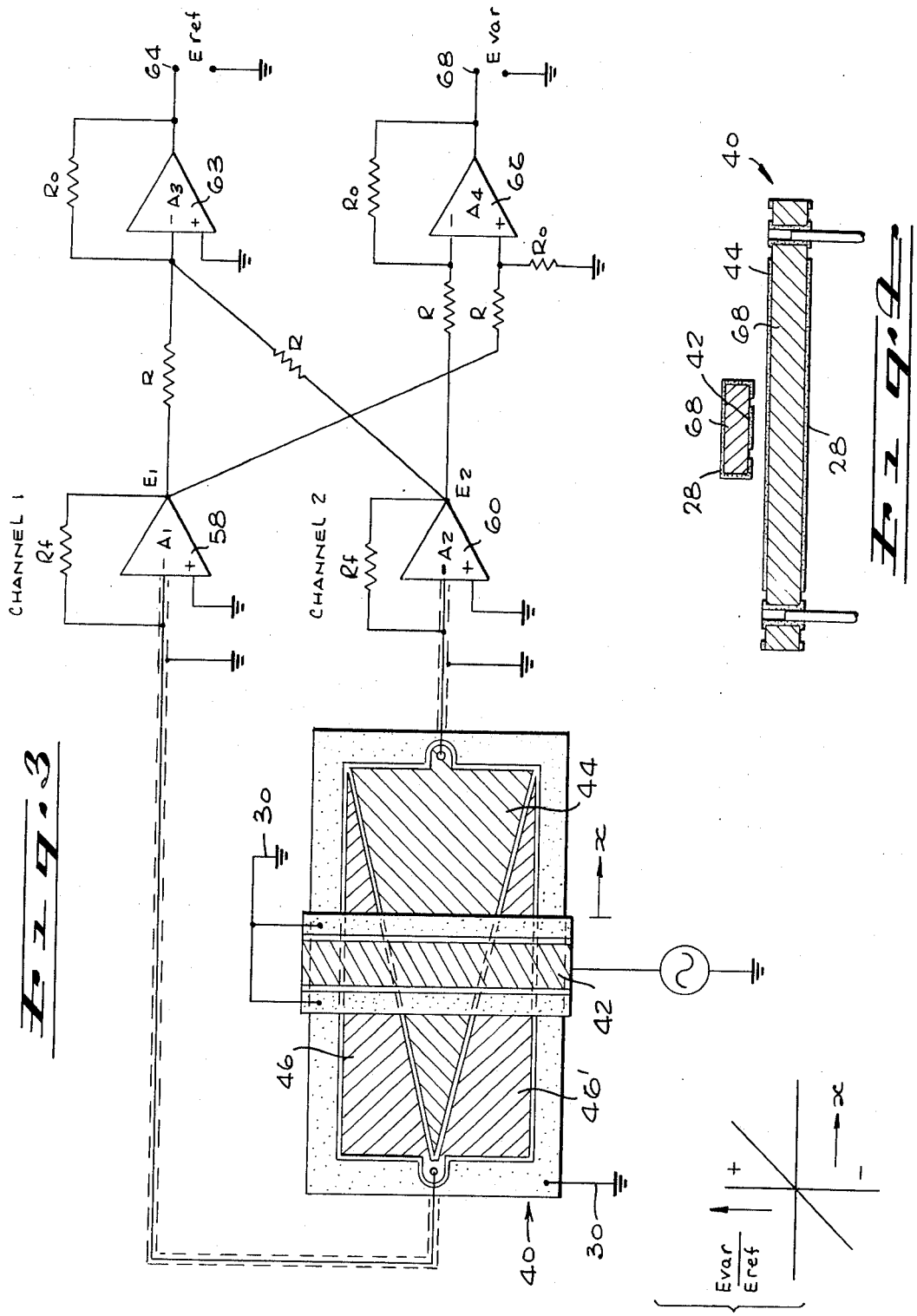

CAPACITIVE POSITION TRANSDUCER

BACKGROUND OF THE INVENTION

1. Field of the Invention

This invention relates to position responsive apparatus for determining the relative position or change of relative position between two relatively movable members and, more particularly, to apparatus for measuring relative movement that is independent of gap variations between moving electrodes.

2. Description of the Prior Art

The art of capacitive positioning devices has long recognized that mechanical limitations existing between opposing electrodes severely limit the final accuracy of such devices. For example, U.S. Pat. No. 3,348,133 by C. Wolfendale describes the problems associated with mechanical limitations and imperfections of capacitive and potentiometer devices.

U.S. Pat. No. 3,631,430, issued to G. West, describes still another scheme for improving the accuracy of capacitive pick-up devices that utilizes an interpolating electrode that is intended to improve accuracy of measuring the relative movement between members.

It has been discovered that the output voltage, which was indicative of the displacement between opposing electrodes, was also directly affected by the gap changes between the electrodes. In addition, it was also recognized that in order to obtain an accurate output, the oscillator voltage and frequency had to be accurately controlled in addition to maintaining the integrity of the gap between the opposing electrodes.

SUMMARY OF THE INVENTION

The present invention contemplates the use of three separate, spaced apart electrodes. The first electrode is positioned for relative movement with respect to said second and third electrodes. In actual practice, the relative movement being actually detected exists between the first electrode relative to both the second and third electrodes. In one embodiment, a uniformly shaped third electrode generates a reference signal. In other embodiments, the second and third electrodes have complementary shapes whereby a substantially constant area is presented to the first electrode.

In a preferred embodiment of the present invention, the second and third electrodes are shaped so that the combination is completely insensitive to all motion save motion in the direction being measured. An ac signal is impressed upon the first electrode. The signal is independently detected by circuitry associated with said second and third electrodes.

In one exemplary embodiment, the third electrode is shaped to have a substantially uniform area adjacent the first electrode while the second electrode, preferably a pair of connected electrodes, is shaped to exhibit a changing area with motion. The signals detected by said second electrode and said third electrode are then available for algebraic combination to generate an output signal which is a measure of the relative movement between the first electrode and the other electrodes, resulting from the change of capacitance between the first and a one of the other electrodes.

An important object of the invention is to provide a capacitive sensor which is insensitive to five of the six degrees of motion and is responsive only to the sixth degree of motion which is then the desired motion to be sensed.

It is also an object of the invention to make the output insensitive to voltage and frequency variations. An output is provided which is the ratio of two voltages that are insensitive to the aforementioned factors. This output voltage ratio is proportional to the ratio of the variable capacitance to a reference capacitance, $E_{var}/E_{ref}$.

In other embodiments, the shape of the second electrode is modified to be variable, as well. Preferably, the electrodes are geometrically related so that, for example, in the preferred embodiment, the sums of areas under the exciter electrode are constant. In this embodiment, the sum of the second and third electrode outputs is the reference voltage while their difference represents the variable voltage. Also, the second and third electrodes can be shaped to exhibit virtually any response to relative motion, from a simple linear increase in area, to area changes that follow some other function, such as the trigonometric ones.

It is also within the scope of the present invention to provide a second and third electrodes of any other arbitrary shape, as well, to produce any empirical or desired response characteristic. Clearly, the present invention has unlimited possibilities as an arbitrary function generator. Also, the electrodes can be made arcuate to measure rotational motion, as well.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 3 illustrates a preferred embodiment of the present invention in which the combined electrode area under the detector electrode is constant with translational motion;

FIG. 4 is a side sectional view of the embodiment of FIG. 3;

DESCRIPTION OF THE PREFERRED EMBODIMENTS

Figure 1:
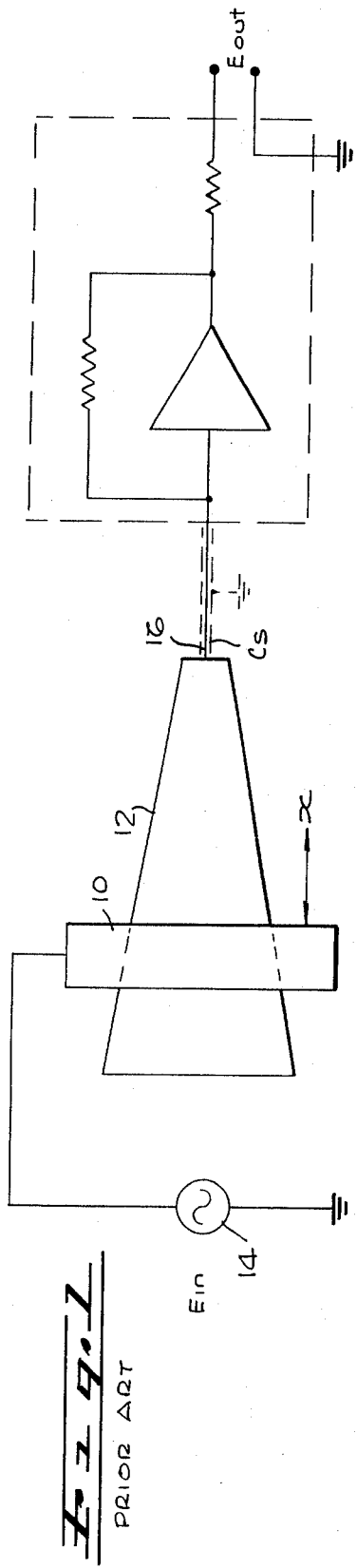
FIG. 1 is a diagram of a prior art device which varies capacitance with linear motion.

Referring now to FIG. 1, there is shown a schematic diagram illustrating a simple, prior art analog capacitance transducer comprising electrodes 10, 12. Detector electrode 12 is shaped to exhibit a varying area to the exciter electrode 10 in response to linear motion in the direction of the arrows. An a.c. input signal from source 14 is impressed upon exciter electrode 10. The relative displacement between electrodes 10, 12 results in a capacitive coupling that provides an output signal from detector electrode 12 at an output terminal 16. Because of the variation of area of detector electrode 12 under the exciter electrode 10, the voltage output is a measure of the relative movement between electrodes 10, 12, which can then be measured at the output terminal 16.

Figure 2:
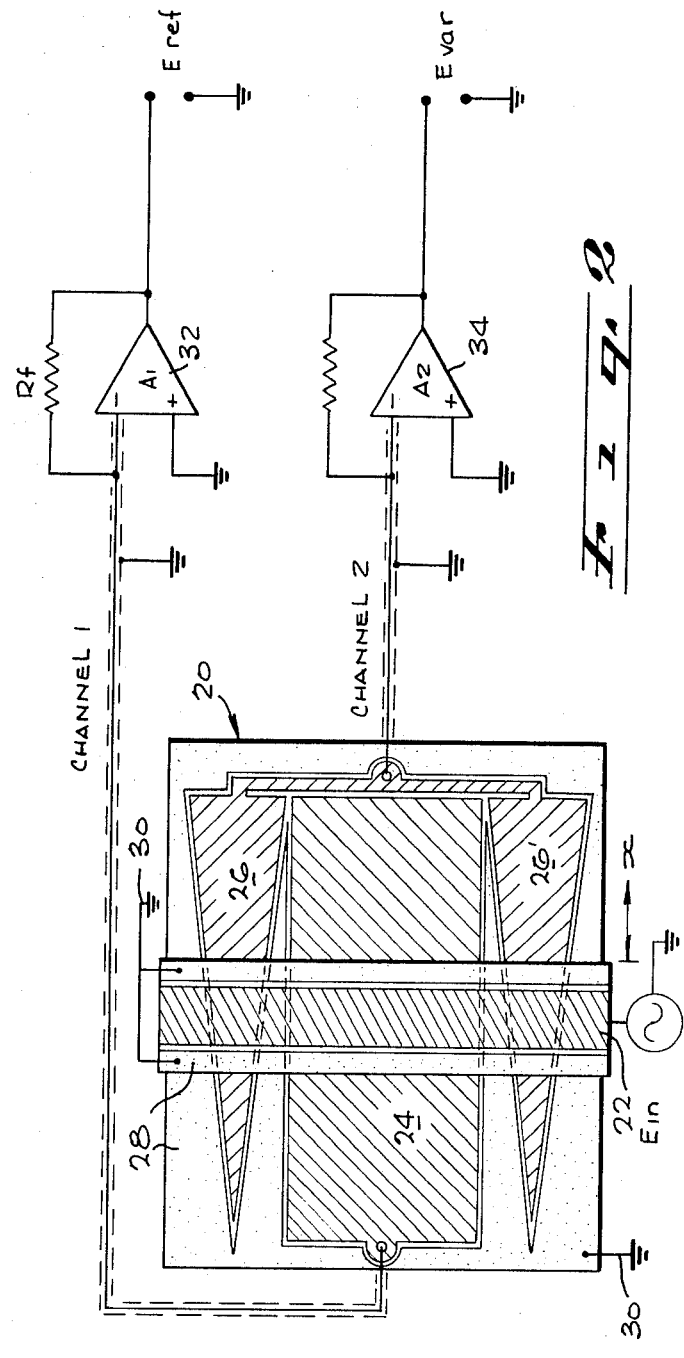
FIG. 2 is a schematic representation of an improved system for measuring the relative movement between opposing electrodes independent of changing gap distance.

Referring now to FIG. 2, there is shown a first embodiment of the present invention. A capacitive position transducer system 20 is composed of three electrodes or plates, including an exciter plate 22 and a pair of receptor plates 24, 26. One of the receptor plates 24 has a substantially rectangular shape and presents substantially the same area to the exciter plate 22 with linear movement. The other plate 26 which, as illustrated includes a first and second plate portion 26, 26', is generally triangular in shape to vary the area under the exciter plate 24 with movement.

The reference capacitance referred to above is then the capacitance between the exciter plate 22 and the rectangular reference receptor plate 24. The variable capacitance is then the capacitance between the exciter plate 22 and the triangular variable plates 26, 26', whose areas vary linearly with the longitudinal motion in the X direction, as indicated by the arrow.

As shown, the exciter and receptor plates are "guarded" with a surrounding conductor 28 that is connected to a source of common reference potential 30, indicated by the conventional ground symbol 30. The guard conductor 28 prevents "fringing," which affects the linearity of the response.

The signal transmitted to the reference receptor plate 24 is applied through a first channel to a first amplifier 32, the output of which may be considered $E_{ref}$, the reference voltage. The variable plates 26, 26' are commonly connected through a second channel to a second amplifier 34, the output of which may be considered $E_{var}$, the variable output.

It will be noted that in the embodiment of FIG. 2, the two, variable receptor plates are substantially identical in shape and each, at its widest part, is one-half the width of the reference plate 24. Therefore, positioning the exciter plate 22 over the receptor plates at the extreme right hand edge would provide a reference output which is substantially equal to the variable output. At the opposite edge, however, it will be seen that the reference signal remains substantially constant, but the variable signal will have diminished to approximately zero.

FIG. 3 illustrates a preferred embodiment of a transducer 40 which more optimally utilizes the area available for the receptor plates. In the design of the transducer of FIG. 3, a signal "null" is produced in the "middle" of the travel, rather than at one end and the circuit is so arranged.

As shown, the exciter plate 42 is substantially the same as in the embodiment of FIG. 2. However, the shapes of the receptor plates are modified and, complementary shapes are provided which completely occupy a rectangular area.

In this embodiment, both the "reference" receptor plate 44 and the "variable" receptor plates 46, 46' have a varying area under the exciter plate 42 and therefore the terms "reference" and "variable" are perhaps a misnomer. The reference plate 44 is an isosceles triangle, and the pair of connected variable plates 46, 46' are right triangles which, if combined, would have an area equal to that of the isosceles triangle of the reference plate 44. As with the embodiment of FIG. 2, guard conductors 28 are provided which are coupled to the source of common reference potential 30.

The variable plates 46, 46' are commonly coupled through a first channel to a first amplifier 58. The output of the reference plate 44 is applied through a second channel to a second amplifier 60. The outputs of the first and second amplifiers 58, 60, are additively combined in a third amplifier 63 to provide, at an output terminal 64, the reference voltage $E_{ref}$. The outputs of the first and second amplifiers 58, 60 are differentially combined in a fourth amplifier 66 to produce, at an output terminal 68, the variable voltage $E_{var}$.

It will be seen, from an examination of the geometry involved, that the additive combining of the outputs of the receptor electrodes 44, 46, 46', provides an output which is representative of a constant area under the exciter electrode 42. This is equivalent to the constant area reference electrode 24 of FIG. 2, above.

Similarly, by applying the receptor outputs to a differential amplifier wherein the outputs are effectively subtracted, it will be seen that a variable output voltage will be produced going from a maximum of a first polarity at one extreme of motion to an equal maximum of opposite polarity at the opposite limit of motion. Midway, the outputs would balance, and the variable output would be zero.

If the desired output is to be zero at the left extreme and a maximum at the right extreme, as in FIG. 2, the fourth amplifier 66 may be eliminated. $E_{var}$ would then be the output of the second amplifier 60. This mechanization requires that the third amplifier 62, be added to the configuration of FIG. 2, but a larger signal magnitude can be produced, since maximum use is made of the available receptor plate area.

Turning next to FIG. 4, the transducer 40 of FIG. 3 is shown in side sectional view. A nonconductive substrate 68 supports the conductive electrodes. The guard conductors 28 are shown adjacent the active, conducting electrodes. The actual electrodes may be a thin conductive film which has been etched in the appropriate shapes.

Figure 6:
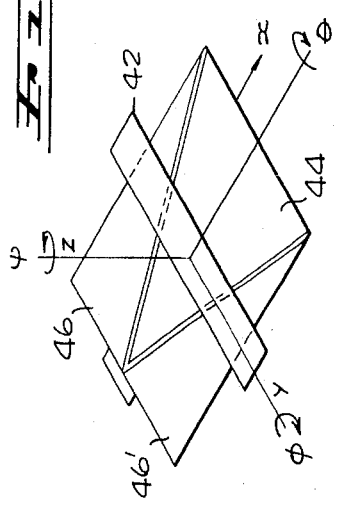
FIG. 6 is a perspective diagram illustrating the insensitivity of the device of FIG. 3 to all but desired motion.
Figure 5:
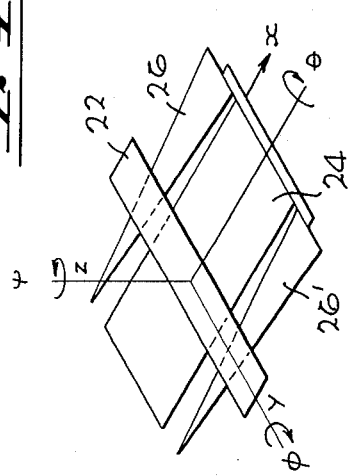
FIG. 5 is a perspective diagram illustrating the insensitivity of the device of FIG. 2 to all but desired motion.

Referring next to FIGS. 5 and 6, the effect of motion in the six degrees of freedom will be discussed relative to the embodiments of FIGS. 2 and 3, respectively. If the transducer is to be responsive to motion only in the X direction, translational motion along the Y axis would have no effect since the exciter plate already overlaps the receptor plates. Similarly, translational motion along the Z axis, which represents a change in the gap, increases or decreases the reference capacitance and the variable capacitance to the same extent, such that the ratio $E_{var}/E_{ref}$ is unchanged.

Rotation about the Z axis in the $\psi$ direction increases the capacitance between the exciter and one of the outer receptor plates, but decreases the capacitance between the exciter and the other of the outer receptor plates by the same amount. However, the capacitance between the exciter and the central receptor plate remains substantially constant. Thus the sum of the outer receptor plate capacitances is unchanged, and the ratio of $E_{var}/E_{ref}$ also remains unchanged.

Rotation about the X axis in the $\theta$ direction increases the capacitance between the exciter plate and one of the outer receptor plates by increasing the gap, but decreases the capacitance between the exciter and the other of the outer receptor plates by decreasing the gap in the same proportion. The capacitance between the exciter plate and the reference plates is therefore unchanged, again leaving the ratio of $E_{var}/E_{ref}$ unchanged.

Rotation of the exciter plate about the Y axis in the $\phi$ direction equally affects the capacitance between the exciter and all of the receptor plates, by reducing the effective area of the exciter plate. Thus the output ratio is unchanged.

Figure 7:
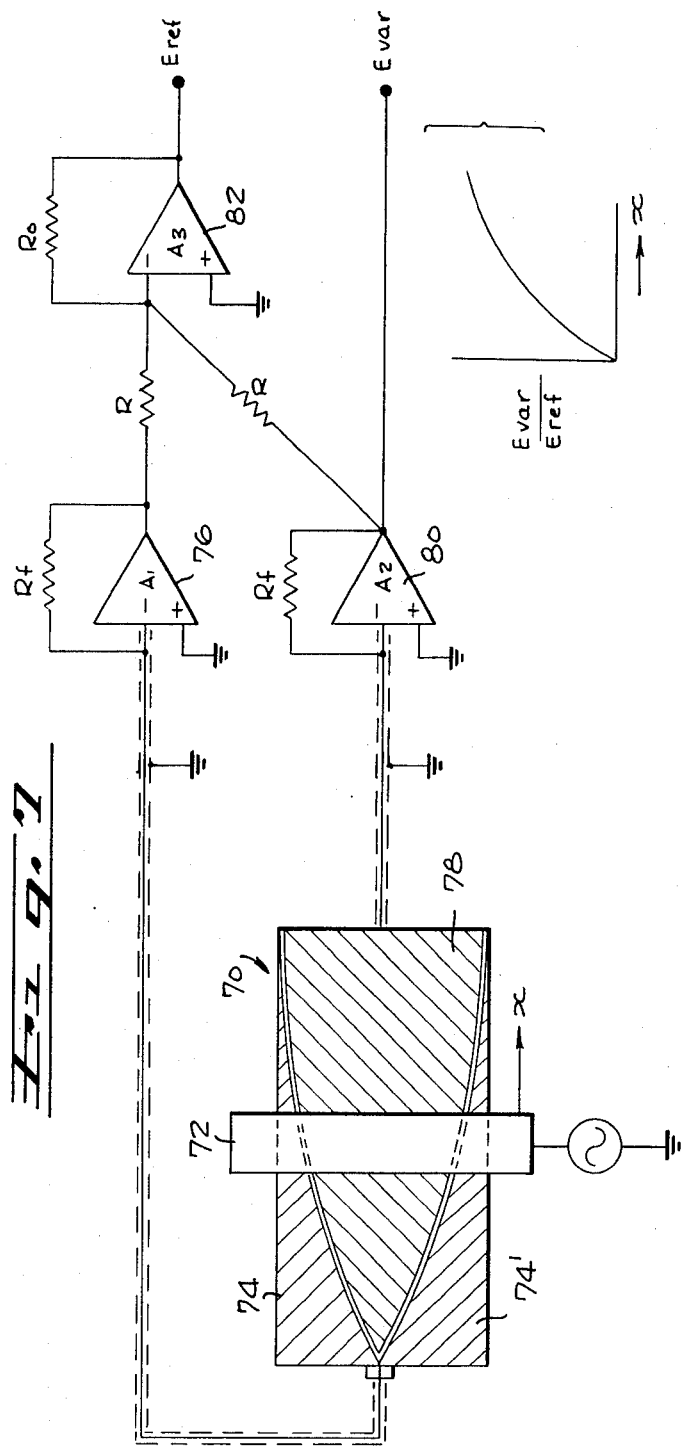
FIG. 7 is a top view of an electrode configuration for producing an output that is non-linear with respect to displacement.

Turning finally to FIG. 7, there is shown a configuration which provides a nonlinear output with translation of the receptor plates relative to the exciter plate. In the illustrated nonlinear transducer 70, the exciter plate 72 is substantially similar to the exciters of the other embodiments.

One of the receptor plates is, in this embodiment, a pair of substantially similar plates 74, 74', which are coupled to a first amplifier 76. A second receptor plate 78 is coupled to a second amplifier 80. The outputs of the first and second amplifiers 76, 80 are additively combined in a third amplifier 82 to provide the reference voltage $E_{ref}$. The output of the second amplifier 80 taken alone, provides the variable output voltage $E_{var}$.

Obviously, other embodiments are possible where the movement to be measured is, for example, circular. In such an arrangement, the receptor plates might be concentric bands of a disc with the subdivision of the receptor plate band varying in some predetermined fashion. Rotational movement would require curved receptor plates.

In all embodiments, it is desirable that the electrode patterns utilized be repeated and connected in parallel in order to average the results and reduce the possibility of local nonlinearities. Further, to optimize the conductive area, the lines subdividing the plates should be as narrow as practical.

What is claimed as new is:

1. A capacitive position transducer system comprising:
    a first, second and third spaced apart electrodes,
    said first electrode of limited area being positioned in a common surface, for relative movement in a predetermined direction with respect to said second and third electrodes and effectively spanning said second and third electrodes,
    said second and third electrodes each having a predetermined area, being positioned in a second surface substantially parallel to said first surface,
    exciter means connected to said first electrode for impressing a signal across said first electrods, said second and third electrodes each independently detecting a portion of said signal; and
    circuit means coupled to said second and third electrodes and responsive to said detected portions of signals for presenting a first, reference output signal whose magnitude is unchanged in response to said relative movement and a second, variable output signal whose magnitude changes in response to said relative movement.

2. A capacitive position transducer system according to claim 1 in which said second electrod presents a constant area to said first electrode, independent of said relative movement and said third electrode presents an area to said first electrode which varies with said relative movement therebetween for providing a signal to said circuit means whose magnitude is independent of said relative movement.

3. A capacitive position transducer system according to claim 1 in which the area presented to said first electrode by said second electrode varies with said relative movement according to a given function determined by the shape of said second electrode, for providing an output signal to said circuit means that varies with said relative movement according to said function.

4. A capacitive position transducer system according to claim 1, wherein said second electrode has a uniformly varying shape and said third electrode includes a first portion and a second portion each adjacent an opposite side of said second electrode, said second and third electrodes combining to present at all times, a constant area to said first electrode, independent of said relative movement.

5. A capacitive position transducer system according to claim 4 wherein said circuit means are additively coupled to said second and third electrodes to provide said first, reference output signal.

6. A capacitive position transducer system according to claim 5 wherein said circuit means are subtractively coupled to said second and third electrodes to provide said second variable output signal.

7. A capacitor position transducer system according to claim 5 wherein said circuit means are coupled to at least one of said second and third electrodes to provide said second variable output signal.

8. The capacitive transducer system according to claim 2, wherein said circuit means include a first signal channel coupled to said second electrode to provide said first, reference output signal and a second signal channel coupled to said third electrode to provide said second, variable output signal.

9. The capacitive transducer system of claim 1, further including a first guard shield surrounding said first electrode in the surface thereof, and a second guard shield surrounding said second and third electrodes in the surface thereof, said guard shields being adapted to be connected to a source of common potential for isolating the electrodes surrounded thereby.

10. The capacitive position transducer system of claim 1, wherein said second surface is a curve, and the relative motion between said first electrode and said second and third electrodes is rotational.

11. The capacitive position transducer system of claim 1, wherein said second surface is a plane and the relative motion between said first electrode and said second and third electrodes is translational.

12. In a capacitive position transducer system, the combination comprising:
    first and second receptor electrodes fixedly located in a common plane and having adjacent spaced-apart edges defining an electrical discontinuity therebetween;
    an exciter electrode fixedly located adjacent said first and second receptor electrodes in spaced relation from the common plan thereof and spanning the electrical discontinuity therebetween, and relatively movable with respect thereto;
    means for connecting said exciter electrode to a source of potential to induce a signal in said receptor electrodes, indicative of the portions of said first and second electrodes spanned by said exciter electrode; and circuit means connected to said first and second receptor electrodes for supplying a first output signal whose polarity and magnitude are independent of relative position of said exciter and receptor electrodes and a second output signal whose polarity and magnitude correspond to and are representative of the relative position of said exciter and receptor electrodes.

13. A capacitive position transducer system according to claim 12 in which said first receptor electrode presents a constant area to said exciter electrode, independent of relative movement therebetween and said second receptor electrode presents an area to said exciter electrode which varies with relative movement therebetween said first receptor electrode providing an output signal to said circuit means whose polarity and magnitude are independent of said relative motion.

14. A capacitive position transducer system according to claim 12 in which the area presented to said exciter electrode by said second receptor electrode varies with said relative movement according to a given function determined by the shape of said second receptor electrode, said second receptor electrode providing an output signal to said circuit means that varies with said relative movement according to said function.

15. A capacitive position transducer system according to claim 12, wherein said first receptor electrode has a uniformly varying sahpe and said second receptor electrode includes a first portion and a second portion each adjacent an opposite edge of said first receptor electrode, said first and second receptor electrodes combining to present, at all times, a constant area to said exciter electrode, independent of said relative movement.

* * * * *